(12) United States Patent
Kamikatano et al.

(10) Patent No.: US 7,806,578 B2
(45) Date of Patent: Oct. 5, 2010

(54) ILLUMINATION DEVICE HAVING LIGHT GUIDE BODY

(75) Inventors: Mitsuru Kamikatano, Sakura (JP); Takashi Tsumanuma, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/107,606

(22) Filed: Apr. 22, 2008

(65) Prior Publication Data

US 2009/0262552 A1    Oct. 22, 2009

(51) Int. Cl.
*F21V 7/04* (2006.01)

(52) U.S. Cl. .................. 362/601; 362/603; 362/613; 362/616; 362/624

(58) Field of Classification Search .................. 362/26, 362/27, 601, 603, 606–607, 612–613, 616–617, 362/623–625, 628, 632, 230–231
See application file for complete search history.

(56) References Cited

U.S. PATENT DOCUMENTS

| | | | |
|---|---|---|---|
| 5,283,968 A * | 2/1994 | Williams | 40/546 |
| 5,743,616 A * | 4/1998 | Giuliano et al. | 362/612 |
| 6,811,273 B2 * | 11/2004 | Satoh et al. | 362/27 |
| 6,854,854 B2 * | 2/2005 | Hoelen et al. | 362/27 |
| 7,237,939 B2 * | 7/2007 | Kim et al. | 362/616 |
| 7,293,893 B2 * | 11/2007 | Kim | 362/205 |
| 7,534,026 B2 * | 5/2009 | Uehara et al. | 362/616 |
| 2002/0163791 A1 * | 11/2002 | Hoelen et al. | 362/31 |

FOREIGN PATENT DOCUMENTS

| | | |
|---|---|---|
| JP | 2000-251516 A | 9/2000 |
| JP | 2003-083776 | 3/2003 |
| JP | 2004-200177 A | 7/2004 |
| JP | 2004-303564 A | 10/2004 |
| JP | 2004-327069 A | 11/2004 |
| JP | 2007-109554 | 4/2007 |

* cited by examiner

*Primary Examiner*—Thomas M Sember
(74) *Attorney, Agent, or Firm*—Sughrue Mion, PLLC (57) ABSTRACT

The illumination device is provided with a plurality of light guide bodies, the bottom face of which is given light reflection/scattering treatment, light sources individually connected to the end portions of a plurality of the light guide bodies to radiate the bottom faces of a plurality of the light guide bodies, and a control unit for changing the intensity of light made incident from the light sources to a plurality of the light guide bodies. A plurality of the light guide bodies are laminated so as to be at least partially overlapped at the respective light emitting regions of the light guide bodies, and the control unit allows the intensity of light made incident from the light sources to the light guide bodies to change with the lapse of time.

10 Claims, 5 Drawing Sheets

ILLUMINATION DEVICE HAVING LIGHT GUIDE BODY

BACKGROUND OF THE INVENTION

1. Field of the Invention

The present invention relates to an illumination device having a light guide body which serves as a sheet-like or a strip-like light-emitting face.

2. Description of the Related Art

In recent years, there have been frequently used a light emitting diode (hereinafter, sometimes referred to as an "LED"), a cold cathode tube or the like as a light source for illumination due to a higher luminous efficiency. However, the LED, which is a point light source, is of directivity, thus finding only a limited use as an independent spot illumination. The cold cathode tube represented by a fluorescent lamp is used widely as a light source in general. When the cold cathode tube is used as a uniform sheet-like light source, there is adopted a method in which many cold cathode tubes are arranged to have diffusers disposed in front of them. However, this method poses such a problem that the effective use of space is lost.

As such, light guide-type illumination devices in which techniques for a light guide plate and a light pipe represented by a backlight for a liquid crystal display are used to convert a point light source such as LEDs to a line light source or convert a line light source, such as cold cathode tubes, to a sheet-like light source have been adopted.

Illumination includes not only static lighting uses in general but also lighting uses represented by neon signs which make dynamic expressions. The dynamic lighting uses include indicators for vehicles, and an illumination device excellent in appearance and visibility has been disclosed in Japanese Unexamined Patent Application, First Publication No. 2003-83776, for example.

However, where the above-described dynamic expressions are made, for example, by using an LED, a plurality of the LEDs are prepared, and then the LEDs are illuminated by turns. Specifically, an illumination device is able to make one-dimensional expressions by arraying many LEDs linearly and also able to make two dimensional dynamic expressions by arraying many LEDs in a sheet-like manner (so called image expression). However, the above method for giving a difference in time interval requires many LEDs densely disposed and also requires a power source for driving each of the LEDs. For example, if the above method for illuminating the LEDs by turns is used in a case where expressions of relatively simple and patternized motions such as interior signs, indicators of vehicles and displays of signboards are sufficient, the costs to be perform the method reduce the effect.

On the contrary, if an illumination device is lit by using a small number of LEDs for the purpose of reducing the cost, a problem is posed in that no smooth motions are realized or in that brightness varies easily (hereinafter referred to as "variance in brightness") in an attempt to obtain a uniform distribution of brightness in a static state. In order to suppress the above-described variance in brightness, there is another method in which light sources such as LEDs or electric bulbs are made uniform to dispose the light sources and optical elements including a diffuser. However, this method requires a specific space between the light source and the optical element, consequently contributing to a large-sized illumination device.

Further, Japanese Patent Application, First Publication No. 2003-83776 has disclosed that luminous bodies (light guide bodies) disposed adjacently in a concentric manner are lit on and off sequentially. However, in order to eliminate variance in brightness, it is necessary to densely dispose the luminous bodies and also dispose diffusers in front of them. Thus, there is provided no solution for removing the disadvantage of higher costs.

The present invention has been made in view of the above circumstances, an object of which is to provide an illumination device capable of making dynamic expressions at lower costs and also suppress variance in brightness.

SUMMARY OF THE INVENTION

A first aspect of the illumination device of the present invention is provided with a plurality of light guide bodies, the bottom face of which is given light reflection/scattering treatment, light sources individually connected to the end portions of a plurality of the light guide bodies to radiate the bottom faces of a plurality of the light guide bodies, and a control unit for changing the intensity of light made incident from the light sources to a plurality of the light guide bodies. A plurality of the light guide bodies are laminated so as to be at least partially overlapped at the respective light emitting regions of the light guide bodies, and the control unit allows the intensity of light made incident from the light sources to the light guide bodies to change with the lapse of time.

In the first aspect of the illumination device of the present invention, when light made incident to a plurality of the light guide bodies is individually of a specific intensity, a uniform distribution of brightness may be obtained on each of the light-emitting faces of a plurality of the light guide bodies.

In the first aspect of the illumination device of the present invention, at least one of the light-emitting and the light-quenching of the light guides may be performed by turns.

In the first aspect of the illumination device of the present invention, the light reflection/scattering treatment may be white printing, groove processing, dot processing, rough surface treatment or a combination thereof.

In the first aspect of the illumination device of the present invention, the light sources may be light emitting diodes which are changeable in color.

A second aspect of the illumination device of the present invention is provided with a plurality of light guide bodies, at least one of the bottom face or the side face of which is given light reflection/scattering treatment, light sources individually connected to the end portions of a plurality of the light guide bodies to radiate the bottom faces or the side faces of a plurality of the light guide bodies, and a control unit for changing the intensity of light made incident from the light sources to a plurality of the light guide bodies. A plurality of the light guide bodies are arrayed so as to be at least partially overlapped at the respective light emitting regions of the light guide bodies, and the control unit allows the intensity of light made incident from the light sources to the light guide bodies to change with the lapse of time.

In the second aspect of the illumination device of the present invention, when lights respectively made incident to the light guide bodies have uniform intensity, a uniform distribution of brightness may be obtained on each of the strip-like light-emitting faces of a plurality of the light guide bodies.

In the second aspect of the illumination device of the present invention, at least one of the light-emitting and the light-quenching of the light guide bodies are performed by turns.

In the second aspect of the illumination device of the present invention, the light reflection/scattering treatment may be white printing, groove processing, dot processing, rough surface treatment, or a combination thereof.

In the second aspect of the illumination device of the present invention, the light sources may be light emitting diodes which are changeable in color.

According to the illumination device of the present invention, a plurality of the light guide bodies are laminated so as to be at least partially overlapped at the respective light emitting regions of the light guide bodies and the intensity of light made incident from the light sources to a plurality of the light guide bodies is allowed to change with the lapse of time, thus making it possible to provide visual effects of making one-dimensional or two dimensional dynamic changes even by using a smaller number of light sources.

Further, there is no need for densely disposing many light sources as with a conventional case, thus making it possible to reduce the cost. Still further, a uniform brightness is obtained even when a smaller number of light sources are used, thereby suppressing variance in brightness.

DESCRIPTION OF THE PREFERRED EMBODIMENTS

First Embodiment

An explanation will be made for first embodiment of the illumination device of the present invention by referring to FIG. 1 to FIG. 3.

Figure 1:
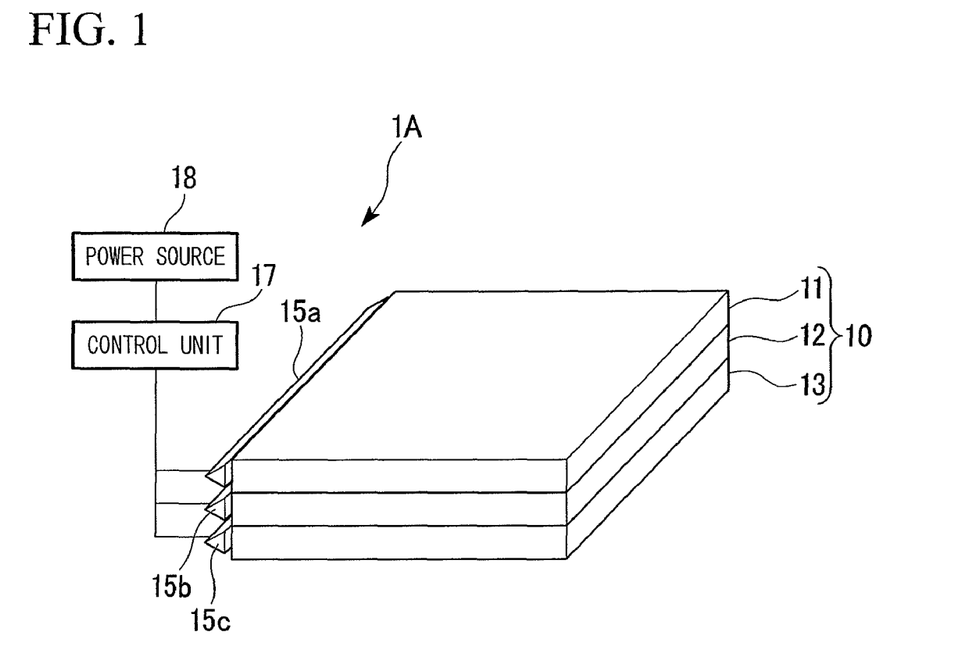
FIG. 1 is a drawing showing First embodiment of the illumination device of the present invention.
Figure 2:
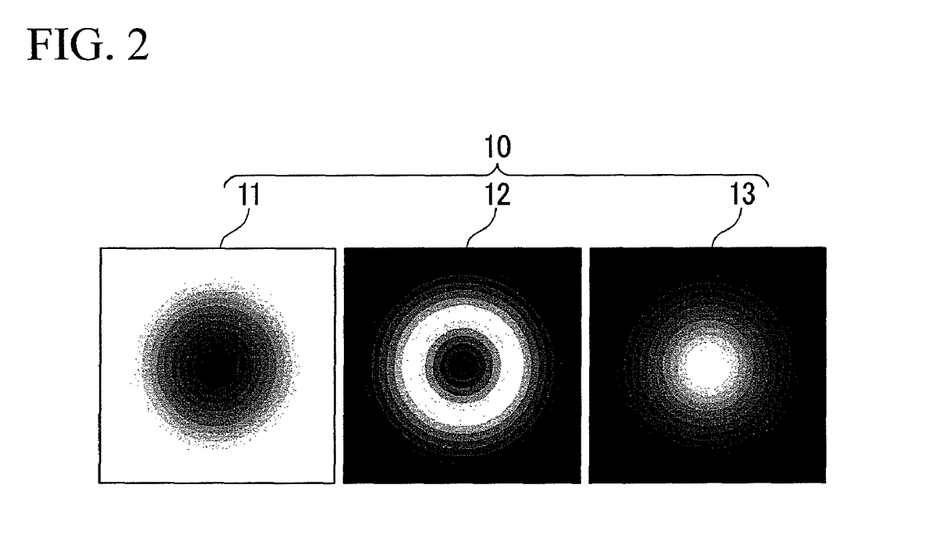
FIG. 2 is a plan view showing a light emitting pattern of a light guide.

As shown in FIG. 1 and FIG. 2, the illumination device 1A of the present embodiment is provided with light sources 15a, 15b, 15c such as light emitting diodes (hereinafter abbreviated as "LEDs") and cold cathode tubes, three (first to third) sheet-like light guide bodies 11, 12 and 13 laminated in the thickness direction, and a control unit 17 for changing the intensity of light made incident from the light sources to the first to the third sheet-like light guide bodies 11, 12 and 13, and connected to a power source 18. The bottom faces of the sheet-like light guide bodies 11, 12 and 13 are given light reflection/scattering treatment, and when light is made incident from the light sources 15a, 15b, 15c connected to the end portion to the sheet-like light guide bodies 11, 12 and 13, the bottom faces of the sheet-like light guide bodies 11, 12 and 13, to which light reflection/scattering treatment is given, serves as light-emitting faces. In the present embodiment, the first to the third sheet-like light guide bodies 11, 12 and 13 are collectively referred to as "light guide 10". Further, the "sheet-like light guide" shows a two-dimensional distribution of brightness, irrespective of a direction at which light is guided, making two-dimensional motions and expressions.

Methods for giving light reflection/scattering treatment to the sheet-like light guide bodies 11, 12 and 13 include white printing, groove processing, dot processing and rough surface treatment (sand blast, etching or embossing). These methods may be used solely or in combination of some of them appropriately, with the costs and workability taken into account.

In the present embodiment, the first sheet-like light guide 11 is disposed on the top. However, the order can be decided arbitrarily, and where the sheet-like light guide bodies 11, 12 and 13 are laminated, it is preferable that the first sheet-like light guide 11 positioned on the top be disposed so as not to block light emitted from the sheet-like light guide 13 positioned below. It is noted that the groove processing and the dot processing are desirable due to a greater effect in scattering light at a smaller processed area.

A light source connected to the light guide 10 may be appropriately selected, depending on the application and the shape of the light guide. LEDs and cold cathode tubes are preferably used as the light source in view of saving space and electricity, as described above. In particular, LEDs changeable in color such as RGB (Red-Green-Blue) are used as each of the light sources, thus making it possible to obtain dynamic light-emitting expressions and a uniform distribution of brightness by using any given color, which is preferable in view of an increased diversity of expressions.

A region for emitting light of a predetermined brightness from the light-emitting face thereof when light is made incident from the light sources 15a, 15b, 15c (light emitting region) is formed on the light-emitting faces of the sheet-like light guide bodies 11, 12 and 13. The brightness of the light emitting region is made different in each of the sheet-like light guide bodies 11, 12 and 13. Therefore, the pattern of the distribution of brightness on the light-emitting face changes depending on individual emitting of the each of the sheet-like light guide bodies 11, 12 and 13. The light-emitting pattern gives a circular stripe which looks like a growth ring.

Specifically, when the first sheet-like light guide 11 is viewed from above, as shown in FIG. 2, the first sheet-like light guide 11 emits light most brightly at an outer part of the outer periphery thereof ((the white area in FIG. 2, this area is bright). The first sheet-like light guide 11 emits light gradually dimly as it moves toward the center thereof (the black area in FIG. 2, this area is dark), and it emits light most dimly at the central part. The second sheet-like light guide 12 emits light most brightly at an intermediate part thereof, while emitting light most dimly at an outer part of the outer periphery and at the center thereof. The third sheet-like light guide 13 emits light most brightly at the center, while most dimly at an outer part of the outer periphery.

In the illumination device 1A, the sheet-like light guide bodies 11, 12 and 13 are laminated so as to be overlapped at the respective light emitting regions. The light emitting region of the light guide 10 (hereinafter, referred to as "synthesized light emitting region") is uniform in brightness when the thus laminated sheet-like light guide bodies 11, 12 and 13 are respectively allowed to emit light of a specific intensity.

Figure 3:
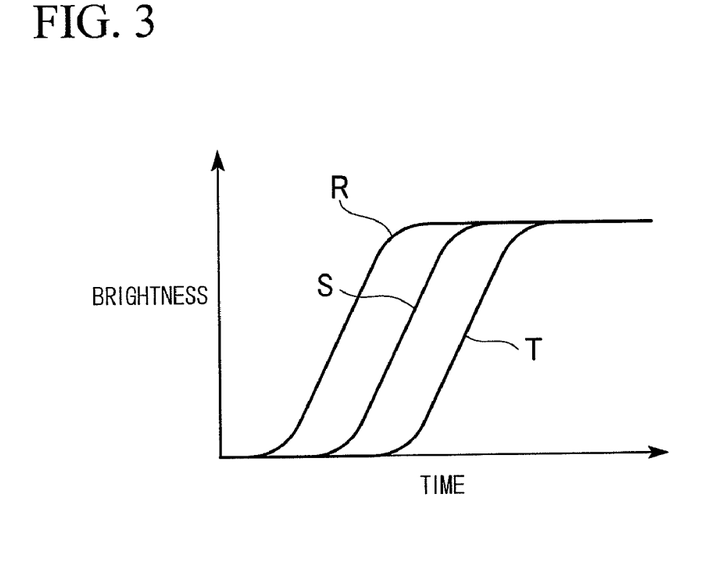
FIG. 3 is a graph showing the changes in brightness of the light guide bodies with the lapse of time.

Further, FIG. 3 shows an example of change in brightness with the lapse of time at the brightest parts of the light emitting regions of the sheet-like light guide bodies 11, 12 and 13 (an outer part of the outer periphery of the sheet-like light guide 11, an intermediate part of the sheet-like light guide 12, the center of the sheet-like light guide 13). In this instance, R, S, T given in FIG. 3 correspond respectively to the sheet-like light guide bodies 11, 12 and 13. When the intensity of light made incident from the light sources to the sheet-like light guide bodies 11, 12 and 13 is allowed to change with the lapse of time so as to obtain the above-described change in brightness (hereinafter, referred to as "change in time"), there is also found a temporal change in distribution of brightness of the sheet-like light guide bodies 11, 12 and 13. In this instance, as shown in FIG. 3, firstly the first sheet-like light guide 11 is allowed to emit light, secondly the second sheet-like light guide 12 is allowed to emit light, and thereafter the third sheet-like light guide 13 is allowed to emit light.

As described above, light emitted from the sheet-like light guide bodies 11, 12 and 13 is subjected to change in time, by which light is dynamically emitted so as to be brighter from the outer periphery to the center. The dynamic expression as described in the illumination device 1A gives to a viewer such an impression that light sweeps over from the outer periphery to the center circle.

Further, the sheet-like light guide bodies 11, 12 and 13 are allowed to emit light in a different order. For example, the third sheet-like light guide 13 is allowed to emit light at first, the second sheet-like light guide 12 is then allowed to emit light, and the first sheet-like light guide 11 is allowed to emit light last. The above dynamic expression of the illumination device 1A gives to a viewer such an impression that light generated at the center sweeps to the outer periphery.

In the illumination device 1A, in order to make dynamic expressions smoothly, the brightness change curves given in FIG. 3 are preferably allowed to change evenly and not abruptly or steeply in a rectangular or trapezoidal shape.

In addition, the sheet-like light guide bodies may be laminated in any given number. Where at least two sheet-like light guide bodies are used, they are able to make dynamic expressions. However, the greater the number of the sheet-like light guide bodies, the more detailed and smoother dynamic expressions that can be obtained, which is preferable. There will be an increase in cost where an excessively large number of the sheet-like light guide bodies are used. It is, therefore, necessary to take the cost and the quality into account.

As described above, in the illumination device 1A of the present embodiment, the sheet-like light guide bodies 11, 12 and 13 are laminated so as to be overlapped at the respective light emitting regions, and the intensity of light made incident respectively from the light sources 15a, 15b, 15c to the sheet-like light guide bodies 11, 12 and 13, is allowed to change with the lapse of time, thus making it possible to obtain visual effects in which a small number of light sources are used to produce one-dimensional or two-dimensional dynamic changes.

Further, there is no need for densely disposing many light sources as in a conventional illumination device, thus making it possible to reduce the cost. Still further, a smaller number of light sources can be used to obtain uniform brightness, thereby suppressing variance in the brightness.

In the illumination device 1A of the present embodiment, the sheet-like light guide bodies 11, 12 and 13 are laminated so as to be overlapped at the respective light emitting regions. However, in an illumination device of the present invention, the sheet-like light guide bodies may be laminated so as to be at least partially overlapped at the respective light emitting regions.

Second Embodiment

Next, an explanation will be made for second embodiment of the illumination device of the present invention by referring to FIG. 4. Here, members or parts which are the same as those of first embodiment will be given the same references, an explanation of which will be omitted.

Figure 4:
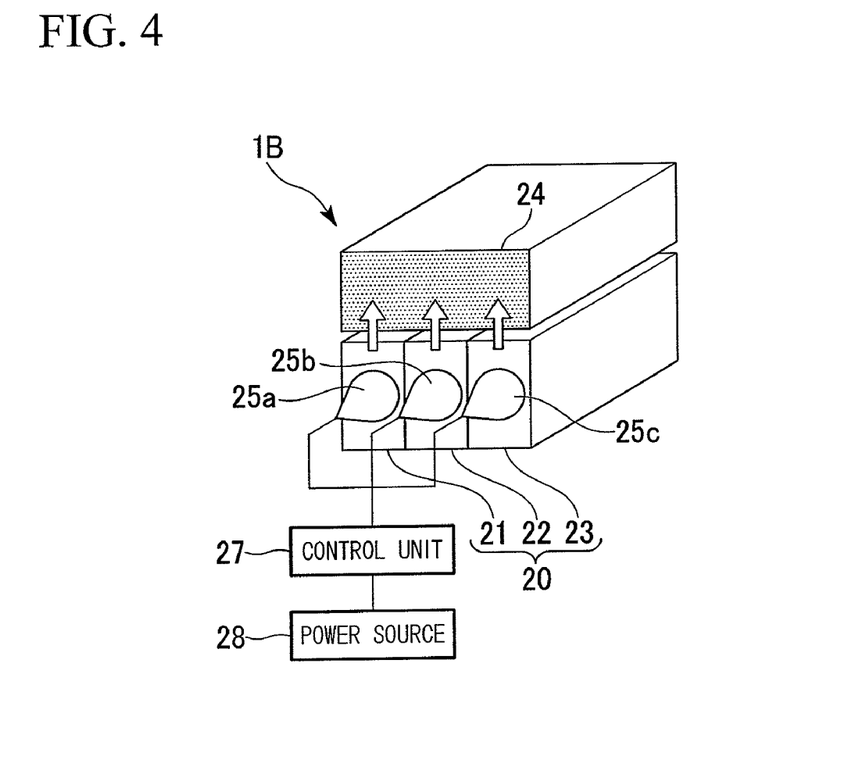
FIG. 4 is a sectional view showing Second embodiment of the illumination device of the present invention.

As shown in FIG. 4, the illumination device 1B of the present embodiment is provided with light sources 25a, 25b, 25c such as LEDs and cold cathode tubes, three (first to third) strip-like light guide bodies 21, 22 and 23 arranged adjacently in the width direction, and a control unit 27 for changing the intensity of light made incident from the light sources to the strip-like light guide bodies 21, 22 and 23, and connected to a power source 28. At least either of the bottom faces or the side faces of the strip-like light guide bodies 21, 22 and 23 are given light reflection/scattering treatment, and when light is made incident from the light sources 25a, 25b, 25c connected to the end portion to the strip-like light guide bodies 21, 22 and 23, the incident light is reflected and scattered in a strip-like manner on the bottom faces or the side faces of the strip-like light guide bodies 21, 22 and 23 to which light reflection/scattering treatment is given. In the present embodiment, the first to the third strip-like light guide bodies 21, 22 and 23 are collectively referred to as "light guide 20", whenever necessary. Further, the "strip-like light guide body" shows a distribution of brightness along a direction at which light is guided, therefore making one-dimensional motions or expressions, and fundamentally showing a uniform distribution of brightness in a direction orthogonal to the direction at which light is guided. The strip-like light guide bodies are primarily formed in a linear or a rod-like shape smaller in width than the length but may be greater in width than the length.

As shown in FIG. 4, diffusers 24 are installed at predetermined intervals on the light-emitting side of the light guide 20. A viewer is able to look indirectly at light emitting regions of the light guide 20 via the diffusers 24. In this instance, the strip-like light guide bodies 21, 22 and 23 are viewed by the viewer so as to be overlapped at the respective light emitting regions.

In the illumination device 1B of the present embodiment, the diffusers 24 are installed on the light-emitting sides of the strip-like light guide bodies 21, 22 and 23 and the intensity of light made incident from the light sources 25a, 25b, 25c respectively to the strip-like light guide bodies 21, 22 and 23 is allowed to change with the lapse of time, by which a smaller number of light sources can be used to obtain visual effects of providing dynamic changes, as with first embodiment.

The strip-like light guide bodies 21, 22 and 23 are not necessarily laminated but they may be arranged adjacently as with the present embodiment, thus making it possible to obtain effects similar to those of first embodiment. It is noted that where the strip-like light guide of the present embodiment is, for example, a rectangular-cylinder light guide, reflection/scattering treatment given to the side face is also able to obtain effects similar to those obtained when the treatment is given to the bottom face.

An explanation has been so far made for first embodiment and second embodiment of the illumination device of the present invention, to which the present invention shall not be, however, limited and may be changed in any way without departing from the spirit of the invention.

For example, in first embodiment and second embodiment, when light made incident to a plurality of light guide bodies is individually of a specific intensity, there is found a uniform brightness of synthesized light emitting regions in a plurality of the light guide bodies. However, where an illumination device is used to make dynamic expressions, a uniform brightness is not always necessary and the brightness may vary.

Further, in first embodiment and second embodiment, the intensity of light made incident into the light guides 10 and 20 is allowed to change so as to be increased with the lapse of time, thereby making such dynamic expression that the illumination device 1B becomes gradually brighter (this instance is referred to as "from dim to bright"). Still further, motions, for example, "from bright to dim" or "bright to dim to bright" may be repeated to make dynamic expressions.

In addition, the light guides 10 and 20 are not always changed in level of brightness but are often required to give a static and uniform brightness. Therefore, in the light guide 10, which is a sheet-like light source, it is preferable that the light guide 10 gives a uniform brightness substantially all across the face thereof when all the sheet-like light guide bodies 11, 12 and 13 are lit. In the light guide 20, which is a strip-like light source, it is preferable that the light guide 20 gives a uniform brightness all across the length in the longitudinal direction when all the strip-like light guide bodies 21, 22 and 23 are illuminating.

In the illumination device 1B of the present embodiment, the strip-like light guide bodies 21, 22 and 23 are arranged so as to be overlapped at the respective light emitting regions. However, in an illumination device of the present invention, each of the strip-like light guide bodies may be laminated so as to be at least partially overlapped at the respective light emitting regions.

Example

An explanation will be made for a more specific example of the present invention by referring to FIG. 5 to FIG. 7. However, the present invention shall not be limited to the following example.

Figure 5:
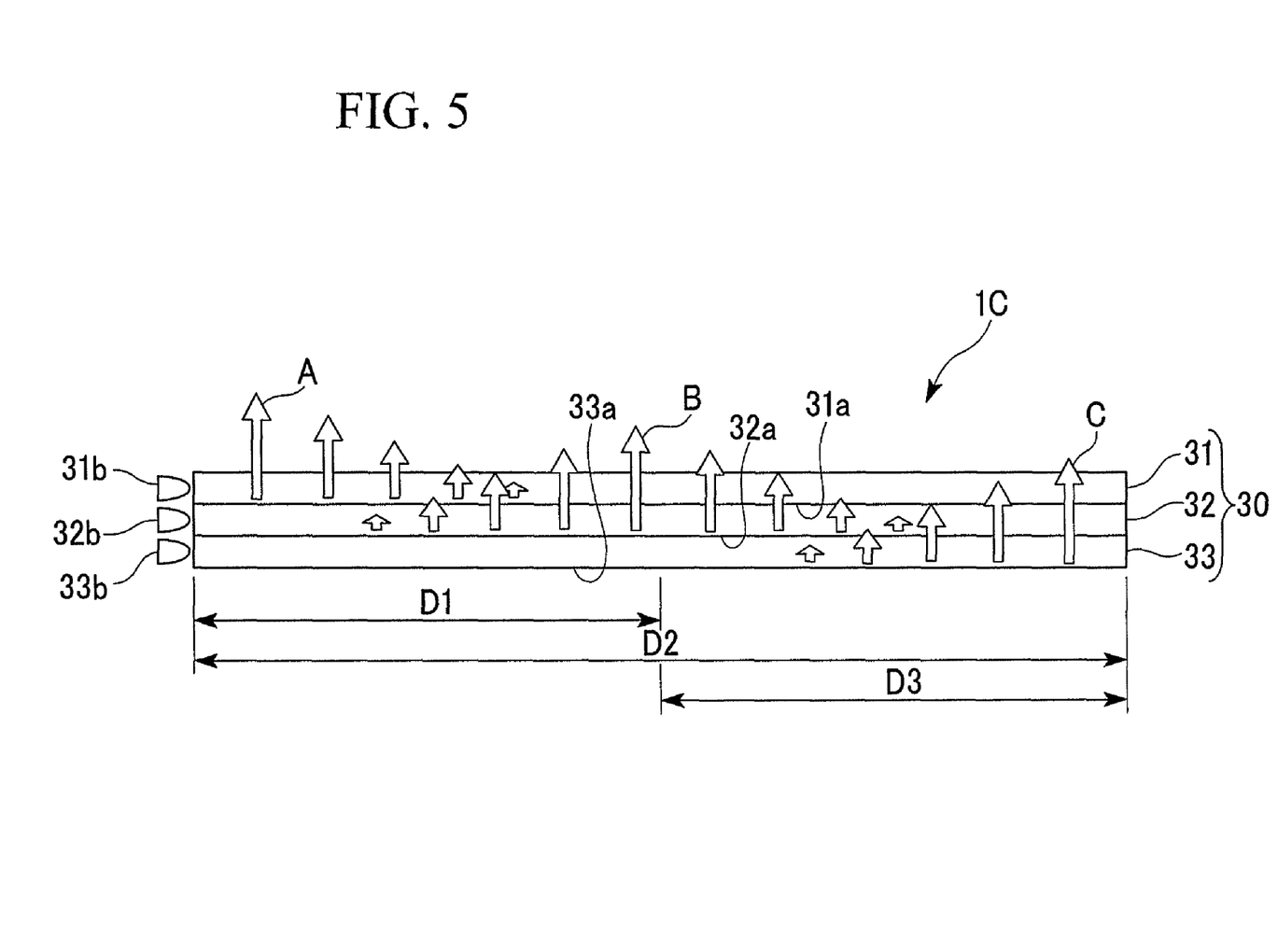
FIG. 5 is a side elevation view showing an example of the illumination device of the present invention.

As shown in FIG. 5, first, three (first to third) strip-like transparent members 31, 32 and 33 made with an acrylic sheet 5 mm in width and 300 mm in length (they are collectively referred to as "strip-like transparent member 30") are used as the light guide bodies of the illumination device 1C. Screen printing is employed to print white dot patterns in a different gradation on the respective side faces 31a, 32a, 33a of the strip-like transparent members 31, 32 and 33 (bottom faces given in FIG. 5).

The strip-like transparent members 31, 32 and 33 are laminated, with the respective light-emitting faces placed upward, and white SMD-type light emitting diodes (LEDs) (E1S13-6W0C6-03 made by Toyoda Gosei Co., Ltd.) are connected to the end faces of the strip-like transparent members 31, 32 and 33 in the longitudinal direction. Hereinafter, the light emitting diodes are referred to as LEDs 31b, 32b, 33b.

As shown in FIG. 5, when the LEDs 31b, 32b, 33b, are electrified at a predetermined ampere for lighting, the strip-like transparent members 31, 32 and 33 emit light, showing a different distribution of brightness (the arrows A, B and C in the drawing as a rough outline) at the respective light emitting regions D1, D2, D3. Specifically, the first strip-like transparent member 31 is gradually smaller in brightness as it moves from the LED 31b to an intermediate part of the light emitting region D1 in the length direction. Further, the second strip-like transparent member 32 is greatest in brightness at an intermediate part of the light emitting region D2 in the length direction and gradually smaller in brightness as it moves from the intermediate part to both of the ends. The third strip-like transparent member 33 is greater in brightness as it moves from an intermediate part of the light emitting region D3 to the other end in the length direction.

Figure 6:
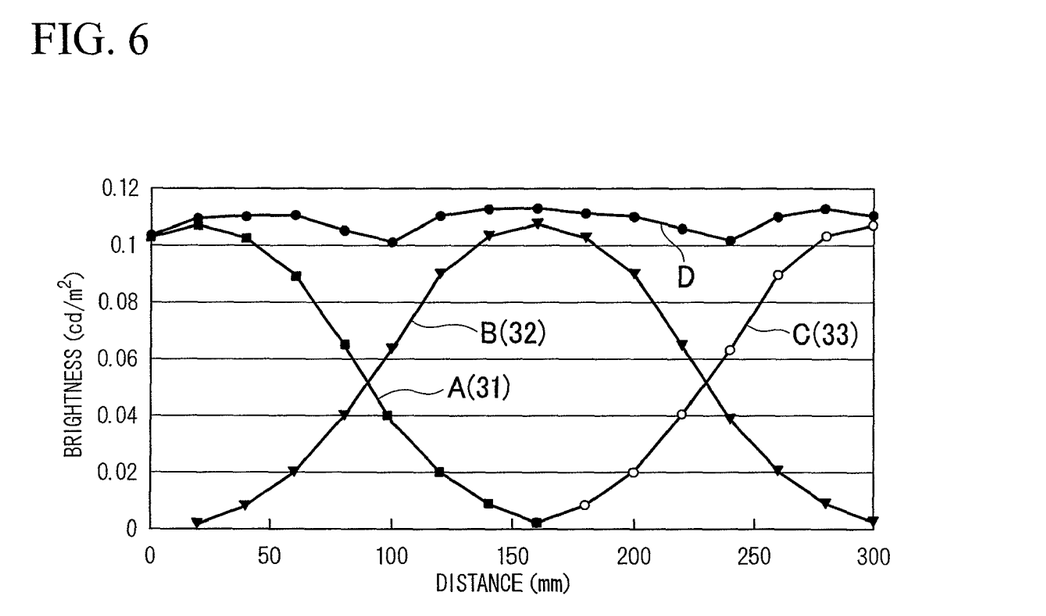
FIG. 6 is a graph showing the brightness distribution curves of the light guide bodies.

When one end face to which the LEDs 31b, 32b, 33b are connected is given as distance zero at each of the strip-like transparent members 31, 32 and 33, there is obtained a distribution of brightness (cd/m$^2$) at a position apart from the one end face by a predetermined distance (mm) along the length direction, which is shown in FIG. 6. In the drawing, the respective lines A, B, C indicate the distributions of brightness corresponding to the first to the third strip-like transparent members 31, 32 and 33. The line D indicates the distributions of brightness at synthesized light emitting regions when the strip-like transparent members 31, 32 and 33 are all lit. The brightness of the strip-like transparent members 31, 32 and 33 fall within an intensity range of 0.1 to 0.12 cd/m$^2$ at the brightest part. Then, the brightness distribution curve of each of the strip-like transparent members 31, 32 and 33 is approximated by the sinusoidal wave pattern.

Programmable power sources (not illustrated) (7651, made by Yokogawa Electric Corporation) are connected respectively to the LEDs 31b, 32b, 33b and electrified in such a manner that the intensity of incident light is allowed to change with the lapse of time. Then, as described above, the strip-like transparent members 31, 32 and 33 emit light by turns.

for example, the time period from the start of light-emitting of each of the strip-like transparent member approaches a predetermined value can set to be two seconds. In addition, the time interval in which each of the strip-like transparent members 31, 32 and 33 starts to emit light is set to be 0.5 seconds. In this instance, it takes three seconds from when the first strip-like transparent member starts to emit light to when the third strip-like transparent member is terminated in emitting light.

Next, an explanation will be made for the change in distribution of brightness at the illumination device 1C at this time, in other words, dynamic expressions.

Figure 7A:
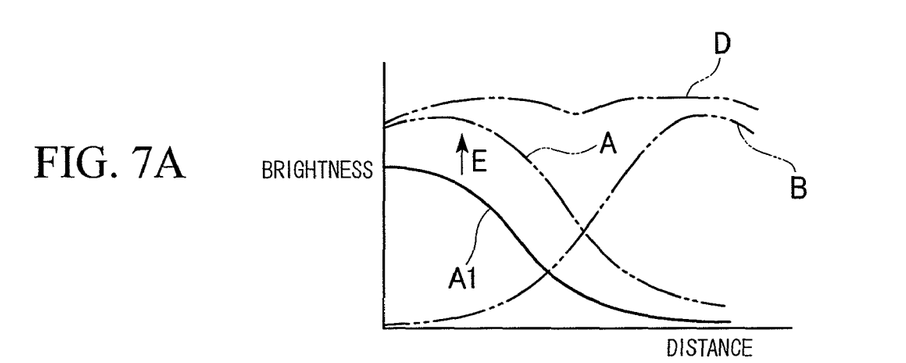
FIG. 7A to FIG. 7D are graphs respectively showing the brightness distribution curves in which change of the brightness with passing of time.

The double dot and dashed line A given in FIG. 7A indicates the brightness when the first strip-like transparent member 31 is lit, the line B indicates the brightness when the second strip-like transparent member 32 is lit, and the line D indicates the brightness obtained by synthesizing the line A with the line B.

Figure 7B:
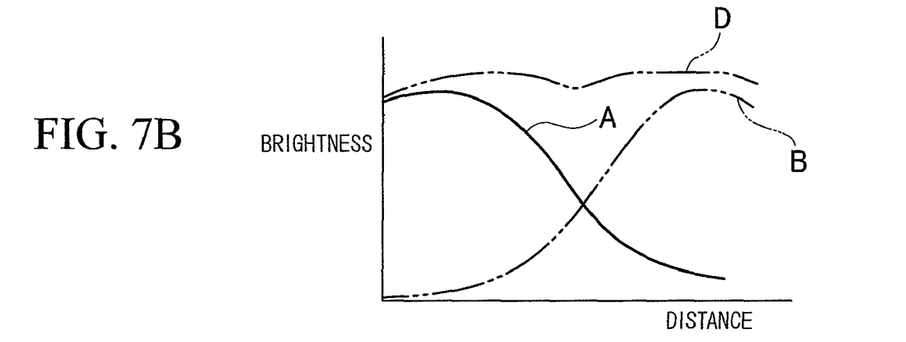
Figure 7C:
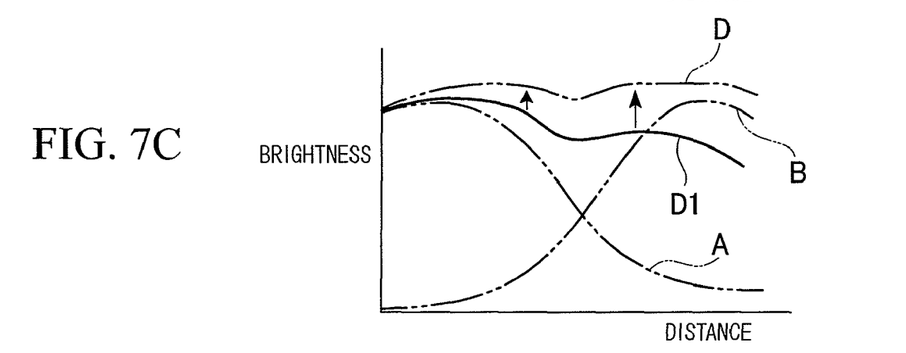
Figure 7D:
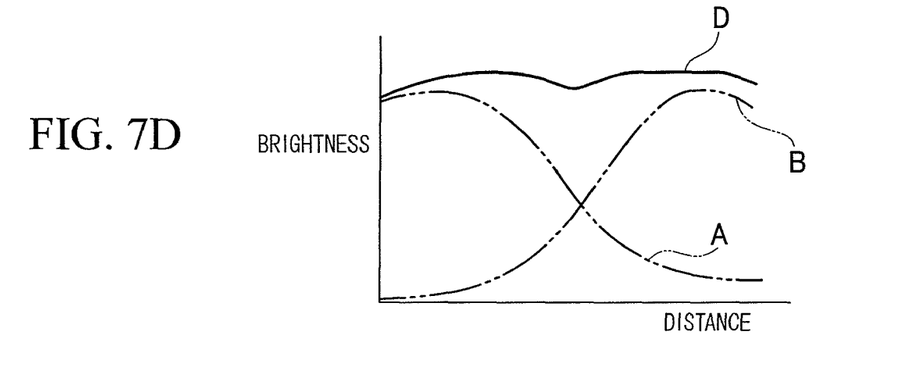

First, as shown in FIG. 7A, the first strip-like transparent member 31 starts to emit light and the intensity of incident light is changed with the lapse of time, by which the brightness is increased (the arrow E) to come closer to the line A. The line A1 indicates a process at which the brightness is made greater. Then, as shown in FIG. 7B, when the brightness of the light emitting region of the first strip-like transparent member 31 reaches the line A (alternatively, before it reaches the line A), thereafter the second strip-like transparent member 32 starts to emit light. Then, as shown in FIG. 7C, the light emitting region of the first strip-like transparent member 31 is synthesized with that of the second strip-like transparent member 32, which comes closer to the double dot and dashed line D. The line D given in FIG. 7D is obtained when the second strip-like transparent member 32 is illuminating.

According to the illumination device 1C, the brightness is changed to make dynamic expressions visually, light is viewed so as to sweep over from LEDs to the other ends of transparent members, and when the strip-like transparent members 31, 32 and 33 are all illuminating, all the light emitting regions are confirmed to be uniform in brightness in the longitudinal direction of the strip-like transparent member 30.

As described so far, first embodiment, second embodiment and the example of the illumination device of the present invention include, for example, doors of a vehicle, indicators used in the interior of a vehicle, decorative lighting on a ceiling or the like, display applications such as interior decorations and signboards, indicators and attention-catching on incorporation into personal computers, TVs and instruments, and indicators or guidance by making one-dimensional expressions.

Further, the light guide bodies are changed in number or light-emitting pattern, thereby making it possible to make complicated dynamic expressions, finding a variety of applications.

What is claimed is:

1. An illumination device, comprising:
   a plurality of light guide bodies which are sheet-like, each of the light guide bodies having at least one light emitting region formed by providing a pattern of a light reflection/scattering treatment on a part of a bottom face of each of the light guide bodies, wherein the light emitting regions of the light guide bodies have different patterns from one another;
   a plurality of light sources individually connected to end portions of the light guide bodies, the light sources radiating each of the bottom faces of the light guide bodies; and
   a control unit which changes the intensity of a light made incident from each of the light sources to each of the light guide bodies; wherein
   and the pattern of the distribution of brightness on the light-emitting face changes depending on an individual emitting of each of the light guide bodies;
   the control unit allows the intensity of the light made incident from each of the light sources to each of the light guide bodies to change with the lapse of time; and
   the light emitting region of the whole of the light guide bodies is uniform in brightness when all of the light guide bodies are respectively allowed to emit light of a specific intensity.

2. The illumination device as set forth in claim 1, wherein when the light made incident to each of the light guide bodies is individually of a predetermined intensity, a uniform distribution of brightness is obtained on each of the light-emitting regions of the light guide bodies.

3. The illumination device as set forth in claim 1, wherein at least one of a light-emitting and a light-quenching of the light guide bodies is/are performed at different times among the light guide bodies.

4. The illumination device as set forth in claim 1, wherein the light reflection/scattering treatment is white printing, groove processing, dot processing, rough surface treatment or a combination thereof.

5. The illumination device as set forth in claim 1, wherein the light sources are light emitting diodes changeable in color.

6. An illumination device, comprising:
   a plurality of light guide bodies which are rod-like, each of the light guide bodies having at least one light emitting region formed by providing a pattern of a light reflection/scattering treatment to a part of a bottom face or a part of a side face of each of the light guide bodies, the light emitting regions having different patterns from one another;
   a plurality of light sources individually connected to end portions of the light guide bodies, the light sources radiating the bottom faces or the side faces of the light guide bodies; and
   a control unit which changes the intensity of a light made incident from each of the light sources to each of the plurality of the light guide bodies;
   wherein the pattern of the distribution of brightness on the light-emitting face changes depending on an individual emitting of each of the light guide bodies,
   the control unit allows the intensity of the light made incident from each of the light sources to each of the light guide bodies to change with the lapse of time, and
   the light emitting region of the whole of the light guide bodies is uniform in brightness when all of the light guide bodies are respectively allowed to emit light of a specific intensity.

7. The illumination device as set forth in claim 6, wherein when the lights respectively made incident to the light guide bodies have uniform intensity, a uniform distribution of brightness is obtained on each of the light emitting regions of the light guide bodies.

8. The illumination device as set forth in claim 6, wherein at least one of a light-emitting and a light-quenching of the light guide bodies is/are performed at different times among the light guide bodies.

9. The illumination device as set forth in claim 6, wherein the light reflection/scattering treatment is white printing, groove processing, dot processing, rough surface treatment, or a combination thereof.

10. The illumination device as set forth in claim 6, wherein the light sources are light emitting diodes changeable in color.

* * * * *